Jan. 2, 1940. G. DÉSAGNAT Re. 21,313

DECORATIVE WALL COVERING

Original Filed Jan. 6, 1931

G. Desagnat
INVENTOR
By: Marks & Clerk
ATTYS.

Reissued Jan. 2, 1940

Re. 21,313

UNITED STATES PATENT OFFICE 21,313

DECORATIVE WALL COVERING

Gaston Désagnat, Paris, France

Original No. 1,930,740, dated October 17, 1933, Serial No. 506,962, January 6, 1931. Application for reissue October 6, 1939, Serial No. 298,225. In France January 13, 1930

11 Claims. (Cl. 41—22)

Figure 1:
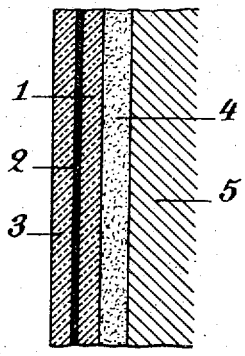

The present invention relates to covering or facing of such hard materials as glass (with or without a mirror or other ornamental backing), porcelain, stone plates, marble plates and the like for walls, ceilings and like plane or curved surfaces.

An object of the invention is to provide a covering of the above character which lends itself readily to application to the wall surface to be decorated therewith and the security and accuracy of attachment and integrity of which is not impaired even though from time to time parts of the wall may shift or become slightly displaced due to vibration and temperature variation.

Another object is to provide a wall covering of the character set forth, which though presenting a facing of rigid or hard material, yet has sufficient flexibility to permit application thereof upon an irregular or curved wall structure, and which moreover admits of sufficient distortion of its face area to take up differences in height or lack of parallelism, as for instance between floor and ceiling.

Another object is to provide a wall covering of the above character which lends itself readily to attaining a wide variety of decorative effects and in which vulnerable ornamental means, such as metal foil, flowers, leaves or colored pastes are effectively applied to glass or like covering material and are sealed against and protected from attack or deterioration due either to atmospheric conditions or to the effect of moisture or chemicals from the wall to which the covering is applied.

According to the invention the hard decorative material of porcelain, stone plate, marble plate or the like, or of glass with decorative backing or facing, is not glued directly to the wall, but is mounted upon a ply of flexible backing material, extending the full area of the covering and securely glued thereto. The backing material is of close texture and not readily pervious to viscous fluid such as mastic, so that the adhesive by which it is bonded to the wall, and the glue by which the hard facing material is bonded to its front face, do not penetrate the thickness of such backing.

The backing material preferred for the purpose is swanskin, or canton flannel, which is a textile fabric of cotton having a long nap on at least one side thereof, but, if desired, a backing of felt, cloth, rubber, sponge rubber, cork or the like could be used to advantage in place of the swanskin.

While the backing material may first be glued to the wall and the decorative covering therefor be thereupon glued to the outer face of such backing, it is preferred to prepare the covering as an article of manufacture with the backing glued thereto.

The hard facing of the covering material is desirably to be sub-divided after application to the backing into sufficiently small elements or tiles so that it will conform to rough, curved or uneven surfaces to be covered thereby. The backing fabric is thus not restrained in its flexibility by a large stiff covering sheet, but due to the jointed relation of successive tiles will accommodate itself to various irregularities of the wall surface to be covered. Moreover under tension, backing material of swanskin may be stretched somewhat longitudinally and transversely since it is not restrained by the rigid tiles at the plurality of joints therebetween. Accordingly the backing may be drawn out sufficiently in the process of application to the wall to take up slight divergence between adjoining sections thereof, due for instance to difference in height or lack of parallelism between floor and ceiling.

Figure 2:
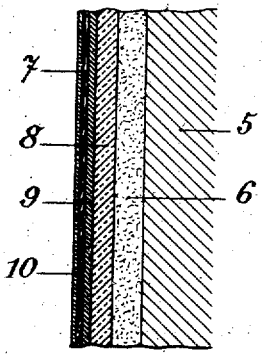
Figure 3:
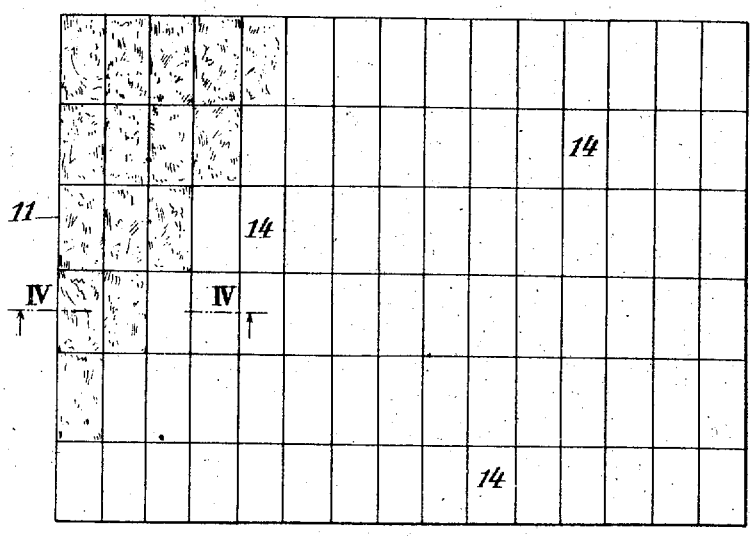
Figure 4:
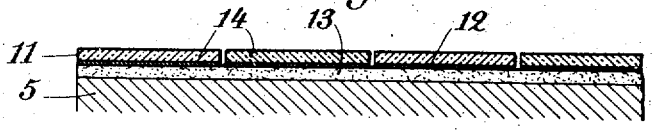

In the accompanying drawings in which are shown certain of the various possible embodiments of the several features of the invention, Fig. 1 shows a view in longitudinal cross-section of one embodiment of the covering material shown applied to a wall, Fig. 2 is a view similar to Fig. 1 of a second embodiment, Fig. 3 is a plan view of a further embodiment in which the rigid decorative facing is composed of small tiles, and Fig. 4 is a transverse sectional view on a larger scale taken on line 4—4 of Fig. 3.

Referring now to Fig. 1 of the drawing, decorative leaf 2 of any of various materials such as metal foil is arranged between two glass sheets or panels 1 and 3 and adhesively connected thereto. Thus the delicate decorative leaf exposed to view through the glass sheet 3 is protected by the two glass sheets 1 and 3 between which it is sandwiched, against mechanical injury and against moisture or other exudation from the wall to which it is to be applied. The panel assembly is glued upon a corresponding area of a napped textile fabric 4 of swanskin or canton flannel which is compressible in thickness and extensible longitudinally and transversely.

The assembled covering consisting of the swanskin backing and the rigid facing structure is readily applied to the wall by appropriate adhesive at the rear face of the backing. The napped swanskin 4 protects the facing and also the bond thereof to the backing, by taking up mechanical stress due to vibration or temperature change of the wall.

In the embodiment of Fig. 2 the decorative effect is attained by a ply of wood 7. Since such wood will not admit of effective attachment directly to the glass surface 8, the latter is first coated with a layer of gelatin 9 or the like, upon which the ply of wood 10 is in turn glued. The backing of swanskin 6 is glued to the back of the glass plate 8 and in turn is glued to wall 5. The ply of wood is preferably covered at its exposed face with a coating of fatty or cellulosic lacquer 10.

In the embodiment of Figs. 1 and 2, the swanskin may be replaced by a backing of felt, cloth, rubber, sponge rubber, cork or the like which like the swanskin will take up mechanical stress, due to vibration or temperature change of the wall.

In the embodiment of Figs. 3 and 4 a section or unit of the wall covering is shown sub-divided into a multiplicity of distinct small rectangular elements or tiles 14. For that purpose such facing is preferably glued upon the backing 13 of swanskin of corresponding dimensions, then cut up into small elements or tiles 14 with an appropriate cutting tool—in the case of glass with a diamond or the like—and the parts are severed at the cuts, without however loosening the same from the backing.

Illustratively the back of each tile 14 is shown coated with a layer 12 of decorative paste which coating is shown directly glued to the ply 13 of swanskin. Thus is obviated the intervening thickness of glass 1 and 8, respectively used in the embodiments of Figs. 1 and 2 for protection of the interleaf in Fig. 1 and of the facing 9 in Fig. 2.

Direct gluing of tiles to the wall would be relatively arduous and time consuming, and when the wall to be covered thereby is subject to marked variations in temperature or to vibrations, the tiles would be abt to become loose. Wall covering sections according to my invention as shown for instance in Fig. 3, are readily glued to the wall or other surface to be covered and will accommodate irregularities in the wall surface. Moreover, because of the considerable number of joints between successive tile elements 14, the swanskin backing may be drawn out sufficiently longitudinally and transversely, to take up slight differences in height or lack of parallelism between the floor and ceiling, so that contiguous edges of successive sections or assemblies such as shown in Fig. 3 may be readily disposed along a continuous surface, with the edges in juxta-position throughout the lengths thereof. After the covering has thus been mounted, the napped swanskin backing 4 guards against strain upon the back of the tile facing or upon the bond thereof to the backing, by taking up mechanical stress due to vibration or temperature change of the wall.

Having thus described my invention, what I claim as new and desire to secure by Letters Patent is:

1. A decorative covering adapted to be directly secured by gluing to the wall to be covered, comprising a rigid decorative plate such as a glass sheet, glued upon a backing sheet of flexible and compressible material of close texture and not readily pervious to viscous fluid such as mastic whereby the adhesive by which the covering is bonded to the wall and the glue by which said plate is bonded to said backing sheet do not penetrate the latter.

2. A decorative covering structure adapted to be directly secured by gluing to a wall, comprising a rigid plate such as a glass sheet and a flexible backing sheet to which said plate is glued, said plate being subdivided into a multiplicity of tiles in jointed relation upon said backing sheet, said backing sheet being of flexible and compressible material of close texture, not readily pervious to fluid such as mastic, whereby the adhesive by which the covering structure is bonded to the wall and the glue by which the rigid decorative plate is bonded to said backing do not penetrate the thickness of such backing.

3. A decorative covering for walls comprising the combination of a pair of rigid plates including a front plate of glass, decorative sheet material sandwiched therebetween, and a backing sheet of flexible and compressible swanskin, said elements being united by gluing the decorative sheet between the rigid plates and the rear of the latter to the backing sheet.

4. A decorative covering for walls comprising the combination of a glass plate, a layer of gelatin thereon and a decorative facing sheet attached with respect to the glass by gluing with respect to said layer of gelatin and a sheet of flexible and compressible swanskin attached to the rear face of said glass plate by gluing and adapted to be glued to a wall.

5. A decorative covering for walls comprising the combination of a glass plate, a layer of gelatin thereon and a decorative ply of wood attached with respect to the glass by gluing with respect to said layer of gelatin, a coating of lacquer on the exposed surface of said ply of wood and a sheet of flexible and compressible swanskin attached to the rear face of said glass plate by gluing and adapted to be glued to a wall.

6. A decorative covering adapted to be directly secured by gluing to a wall, comprising a rigid sheet of transparent material having its rear surface coated with decorative material and a backing of flexible and compressible swanskin adhesively secured thereto.

7. A decorative covering adapted to be directly secured by gluing to a wall to be coated, comprising a multiplicity of tiles glued in jointed relation upon a backing of flexible swanskin which is compressible in thickness and has longitudinal and transverse extensibility at the considerable number of joints between successive tiles.

8. A decorative covering structure adapted to be directly secured by gluing to a wall, comprising a rigid plate such as a glass sheet having a decorative layer on the rear surface thereof and a backing sheet of flexible and compressible swanskin to which said plate is glued, said plate being sub-divided into a multiplicity of tiles in jointed relation upon said backing sheet, the latter having longitudinal and transverse extensibility at the considerable number of joints between successive tiles.

9. A decorative covering structure adapted to be directly secured by gluing to a wall, comprising a rigid plate such as a glass sheet and a flexible backing sheet to which said plate is glued, said plate being subdivided into a multiplicity of tiles in jointed relation upon said backing sheet, said backing sheet being of flexible woven fabric presenting a soft compressible surface, not readily pervious to fluid such as mastic.

10. A decorative covering structure adapted to be directly secured by gluing to a wall, comprising a rigid plate such as a glass sheet and a flexible backing sheet to which said plate is glued, said plate being subdivided into a multiplicity of tiles in jointed relation upon said backing sheet, said backing sheet being of cork, flexible and compressible and of close texture not readily pervious to fluid such as mastic.

11. A decorative covering structure adapted to be directly secured by gluing to a wall, comprising a rigid plate such as a glass sheet and a flexible backing sheet to which said plate is glued, said plate being subdivided into a multiplicity of tiles in jointed relation upon said backing sheet, said backing sheet being of flexible and compressible felt of close texture not readily pervious to fluid such as mastic.

GASTON DÉSAGNAT.